United States Patent
Sasatani et al.

(10) Patent No.: US 10,540,777 B2
(45) Date of Patent: Jan. 21, 2020

(54) OBJECT RECOGNITION DEVICE AND OBJECT RECOGNITION SYSTEM

(71) Applicant: Hitachi, Ltd., Chiyoda-ku, Tokyo (JP)

(72) Inventors: So Sasatani, Tokyo (JP); Masaya Itoh, Tokyo (JP); Ryou Yumiba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 15/580,478

(22) PCT Filed: Jun. 10, 2015

(86) PCT No.: PCT/JP2015/066737
§ 371 (c)(1),
(2) Date: Dec. 7, 2017

(87) PCT Pub. No.: WO2016/199244
PCT Pub. Date: Dec. 15, 2016

(65) Prior Publication Data
US 2018/0165828 A1     Jun. 14, 2018

(51) Int. Cl.
*G06T 7/70* (2017.01)
*G06K 9/00* (2006.01)

(52) U.S. Cl.
CPC ............ *G06T 7/70* (2017.01); *G06K 9/00671* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 2003/0169918 A1* | 9/2003 | Sogawa | G06T 5/006 382/154 |
| 2009/0190800 A1* | 7/2009 | Takahashi | G06K 9/00805 382/104 |
| 2009/0190827 A1* | 7/2009 | Saito | G06K 9/00805 382/154 |

(Continued)

FOREIGN PATENT DOCUMENTS

| | | |
|---|---|---|
| JP | 2002-99906 A | 4/2002 |
| JP | 2013-161187 A | 8/2013 |
| JP | 2013-205410 A | 10/2013 |

OTHER PUBLICATIONS

International Search Report (PCT/ISA/210) issued in PCT Application No. PCT/JP2015/066737 dated Aug. 4, 2015 with English translation (three pages).

(Continued)

*Primary Examiner* — Samah A Beg
(74) *Attorney, Agent, or Firm* — Crowell & Moring LLP

(57) ABSTRACT

An object recognition device includes a recognition unit, a recognition reliability calculation unit, and a combining unit. A recognition unit recognizes an object by a plurality of functions, based on information which is obtained by measuring an object by a plurality of measurement devices. A recognition reliability calculation unit calculates recognition reliability of recognition results that are obtained by recognizing an object by a recognition unit, for each function. A combining unit combines recognition reliability of the object and recognition results, detects a specified object, and outputs detection results of the specified object.

8 Claims, 14 Drawing Sheets

(56) References Cited

U.S. PATENT DOCUMENTS

| | | | | |
|---|---|---|---|---|
| 2011/0001615 A1* | 1/2011 | Kuoch | ................ | B60R 21/0134 340/436 |
| 2011/0002507 A1* | 1/2011 | Kuoch | ................ | B60R 21/0134 382/103 |
| 2013/0322692 A1* | 12/2013 | Guan | ................ | G06K 9/00791 382/103 |
| 2014/0354815 A1* | 12/2014 | Hughes | ................ | G08G 1/163 348/148 |
| 2017/0358102 A1* | 12/2017 | Akiyama | ................... | G06T 7/70 |
| 2018/0038689 A1* | 2/2018 | Takemura | ................ | G01C 3/06 |
| 2018/0165829 A1* | 6/2018 | Hong | ................ | G06K 9/00805 |

OTHER PUBLICATIONS

Japanese-language Written Opinion (PCT/ISA/237) issued in PCT Application No. PCT/JP2015/066737 dated Aug. 4, 2015 (five pages).

* cited by examiner

[Fig. 1]
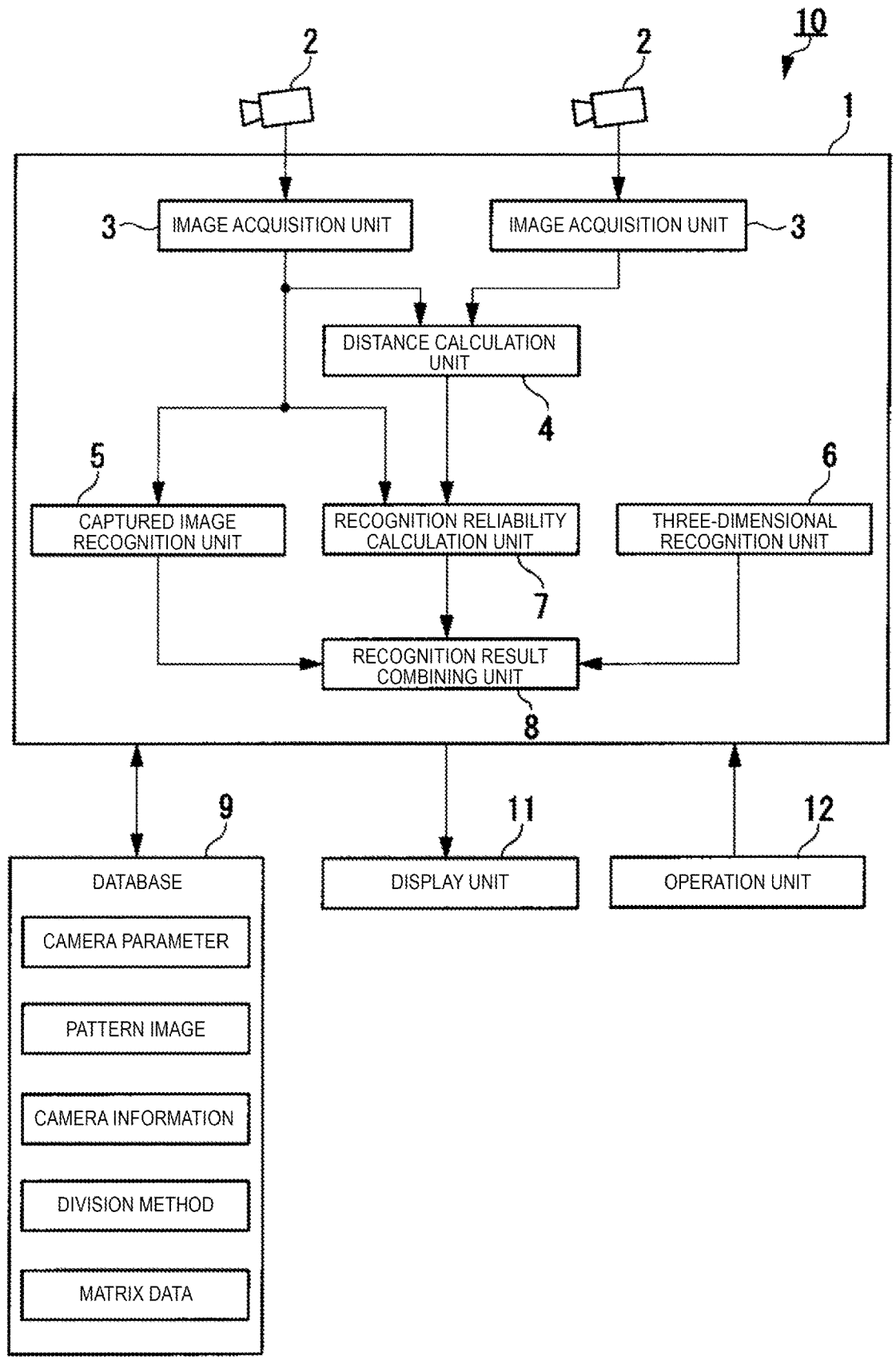

[Fig. 2]
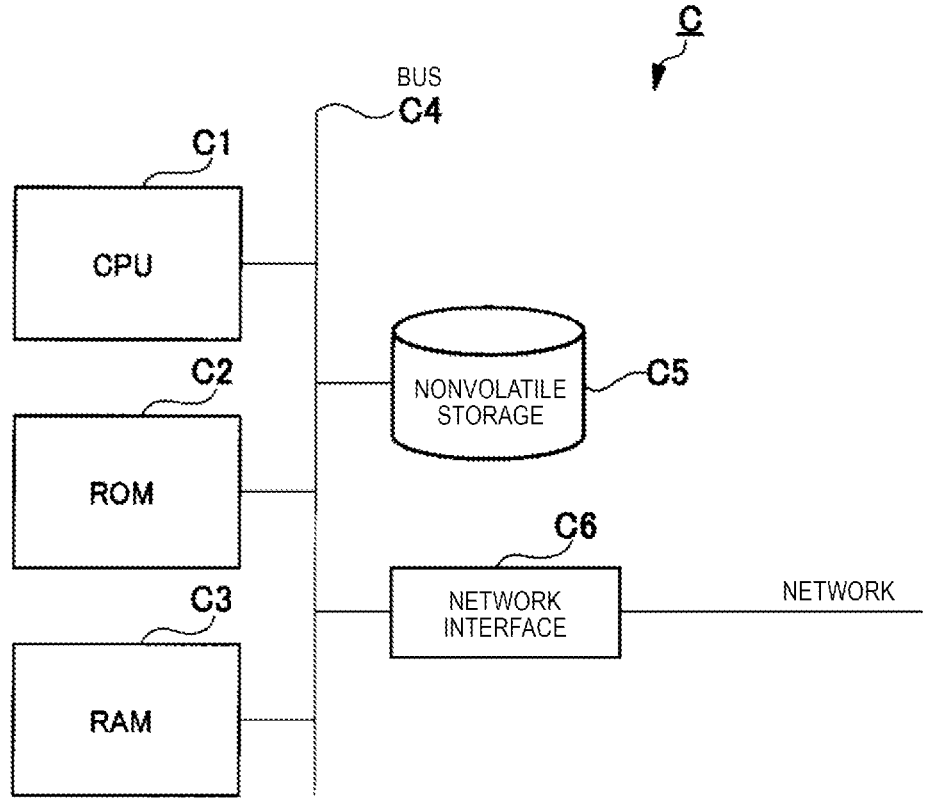
[Fig. 3]
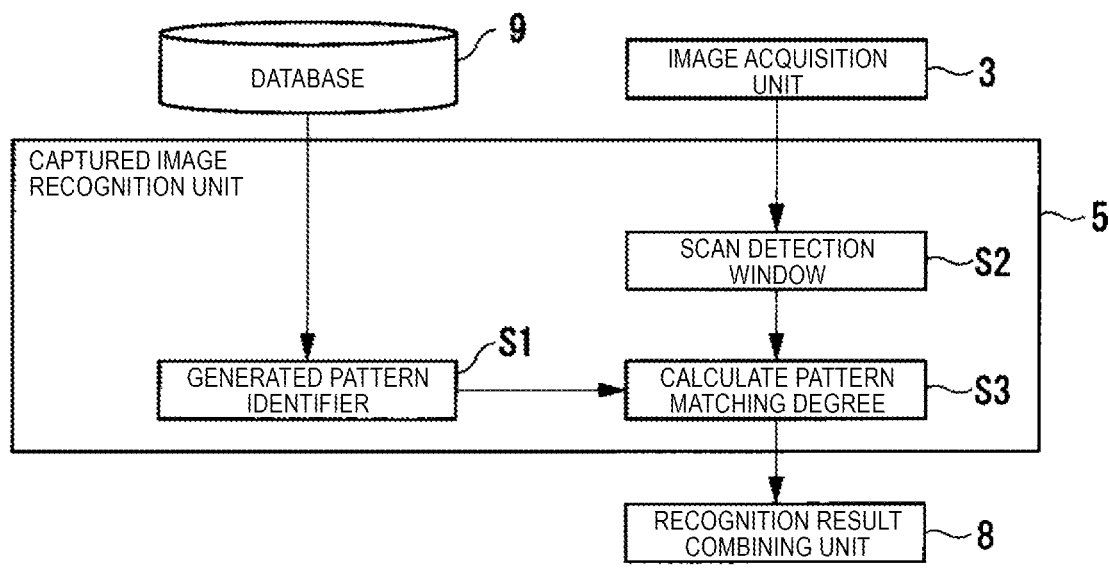

[Fig. 4A]
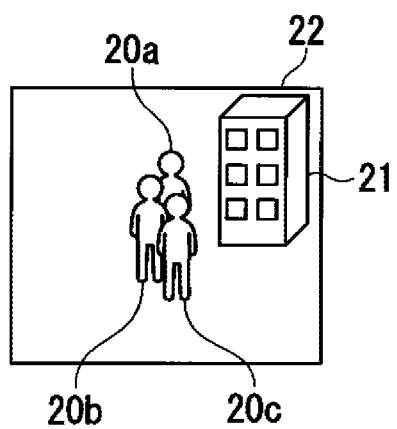
[Fig. 4B]
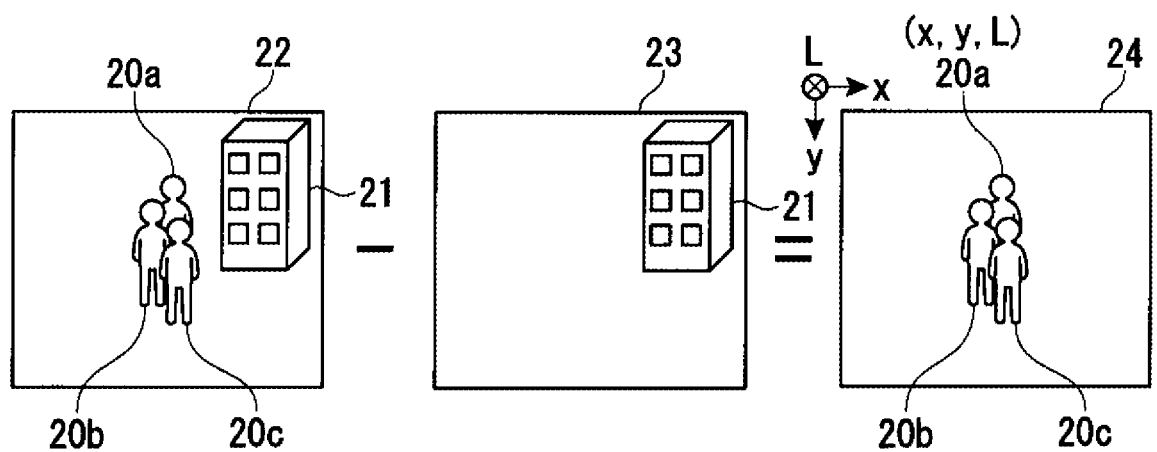

[Fig. 4C]
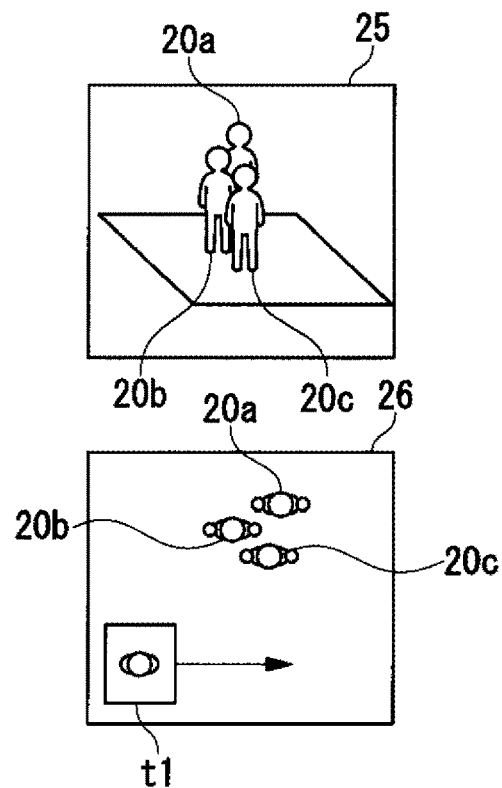
[Fig. 4D]
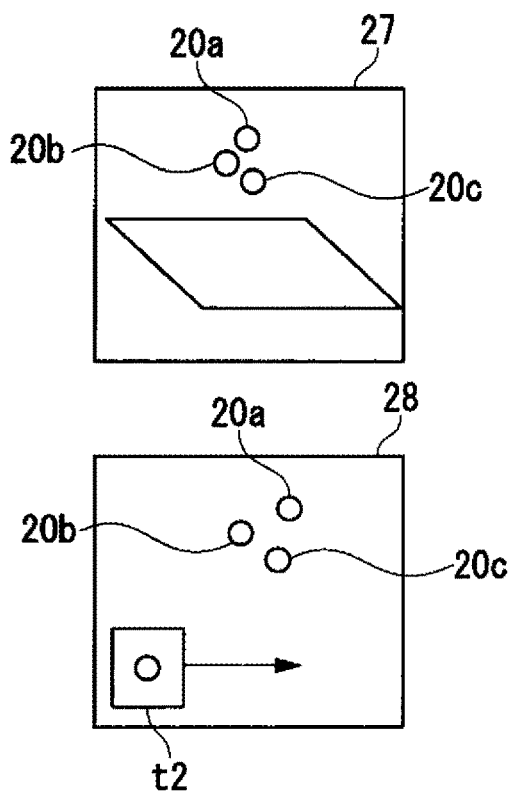

[Fig. 5]
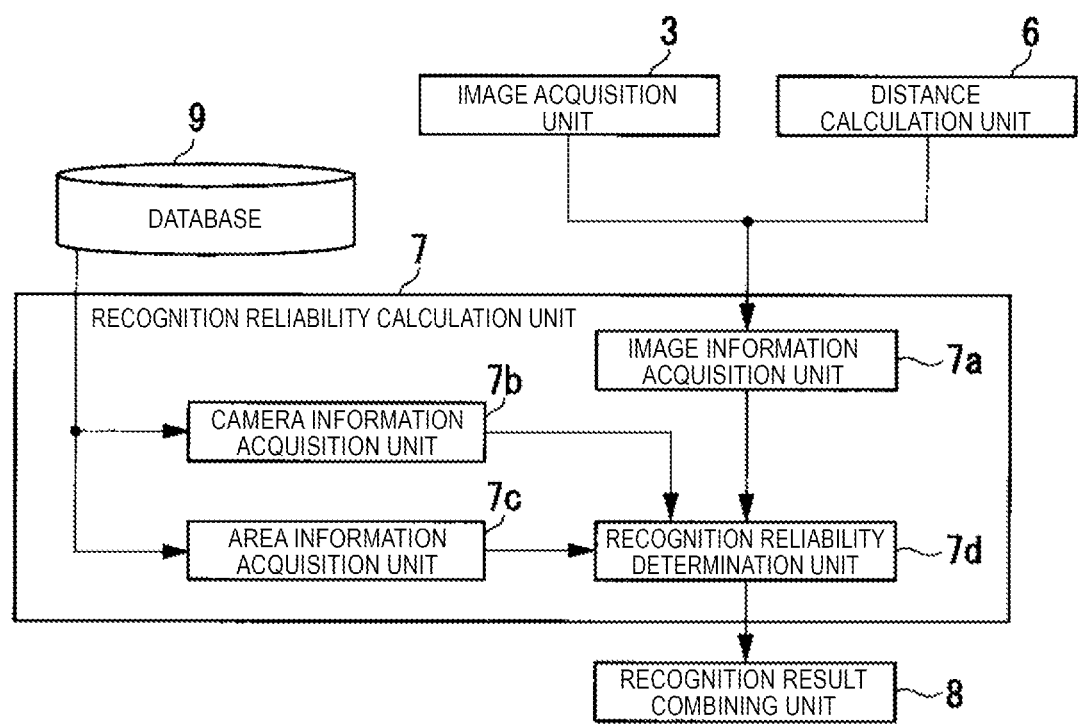

[Fig. 6]
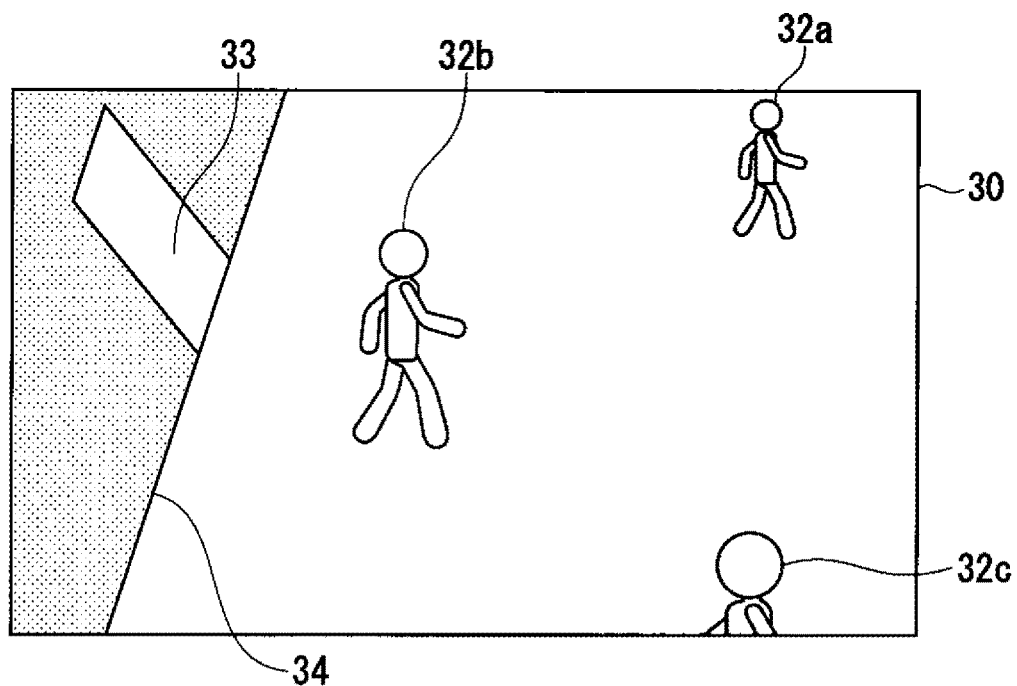
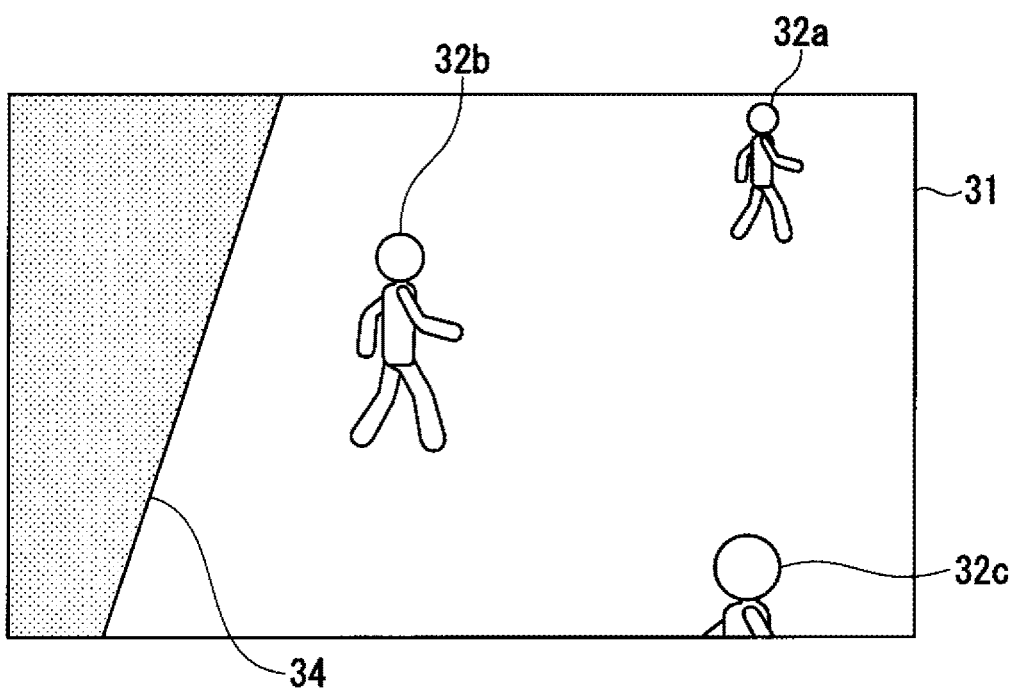

[Fig. 7]

| | | |
|---|---|---|
| INTERNAL INFORMATION | RESOLUTION | 1280 × 960 |
| | FOCAL DISTANCE | 100 |
| | LENS DISTORTION | 0.1 |
| | SKEW | 1.0 |
| | BASE LINE LENGTH | 200 |
| INSTALLATION ENVIRONMENT | PAN ANGLE | 5 |
| | TILT ANGLE | 30 |
| | ROLL ANGLE | 6 |
| | X POSITION | 1000 |
| | Y POSITION | 2500 |
| | Z POSITION | 2000 |

[Fig. 8]
| | RESOLUTION | 1280 × 960 |
|---|---|---|
| INTERNAL INFORMATION | FOCAL DISTANCE | 100 |
| | BASE LINE LENGTH | 200 |
| INSTALLATION ENVIRONMENT | TILT ANGLE | 30 |
| | ROLL ANGLE | 6 |
| | Y POSITION | 2500 |
~40
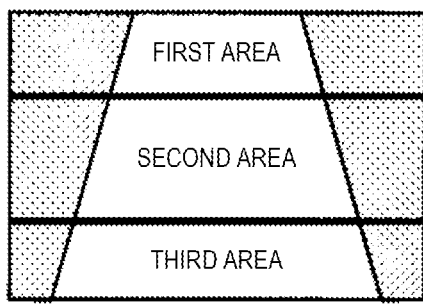
~41
| | IMAGE RECOGNITION | THREE-DIMENSIONAL RECOGNITION |
|---|---|---|
| FIRST AREA | 80% | 20% |
| SECOND AREA | 5% | 95% |
| THIRD AREA | 100% | 0% |
~42

[Fig. 9]
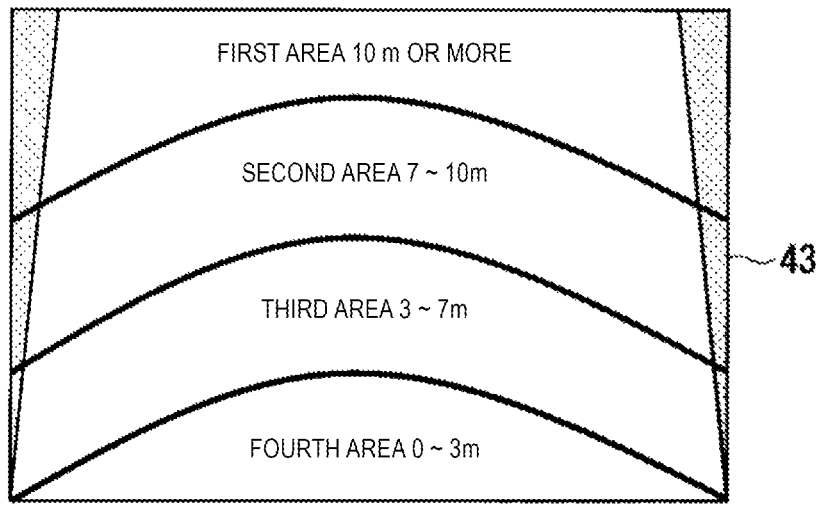
| | IMAGE RECOGNITION | THREE-DIMENSIONAL RECOGNITION |
|---|---|---|
| FIRST AREA | 100% | 0% |
| SECOND AREA | 70% | 40% |
| THIRD AREA | 40% | 70% |
| FOURTH AREA | 0% | 100% |

[Fig. 10]
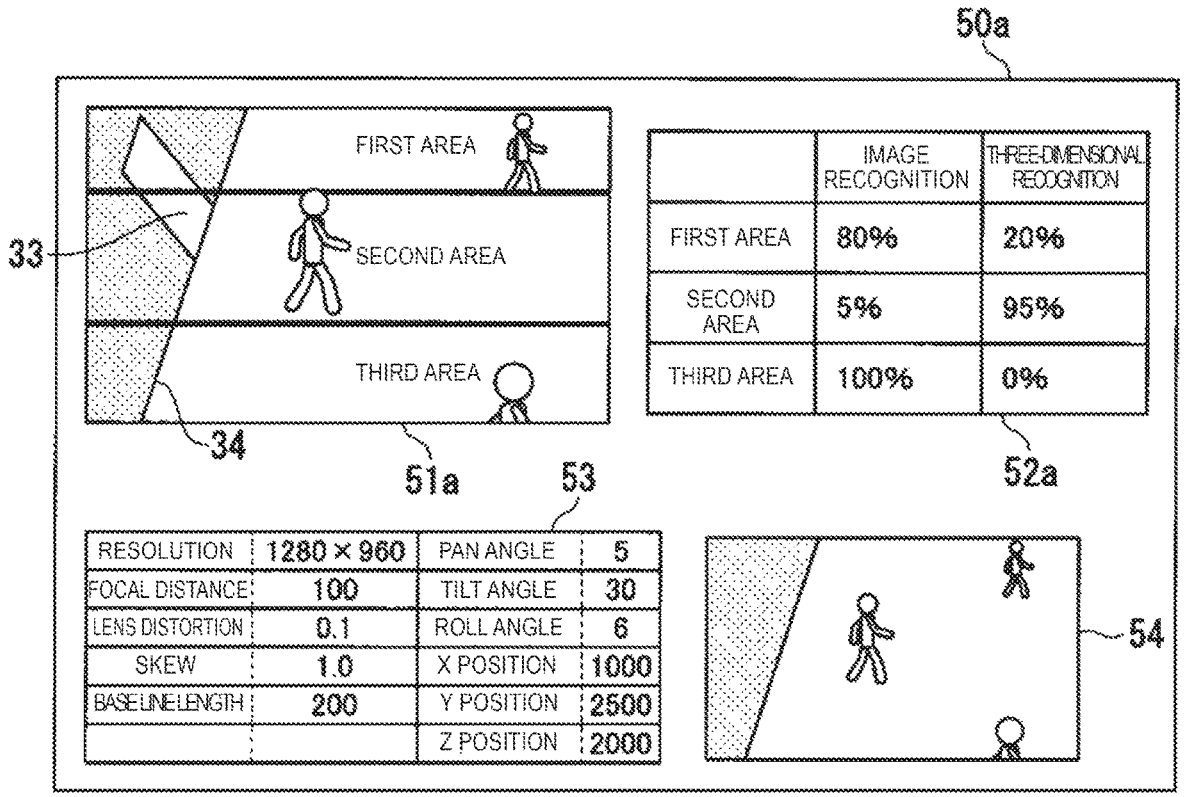
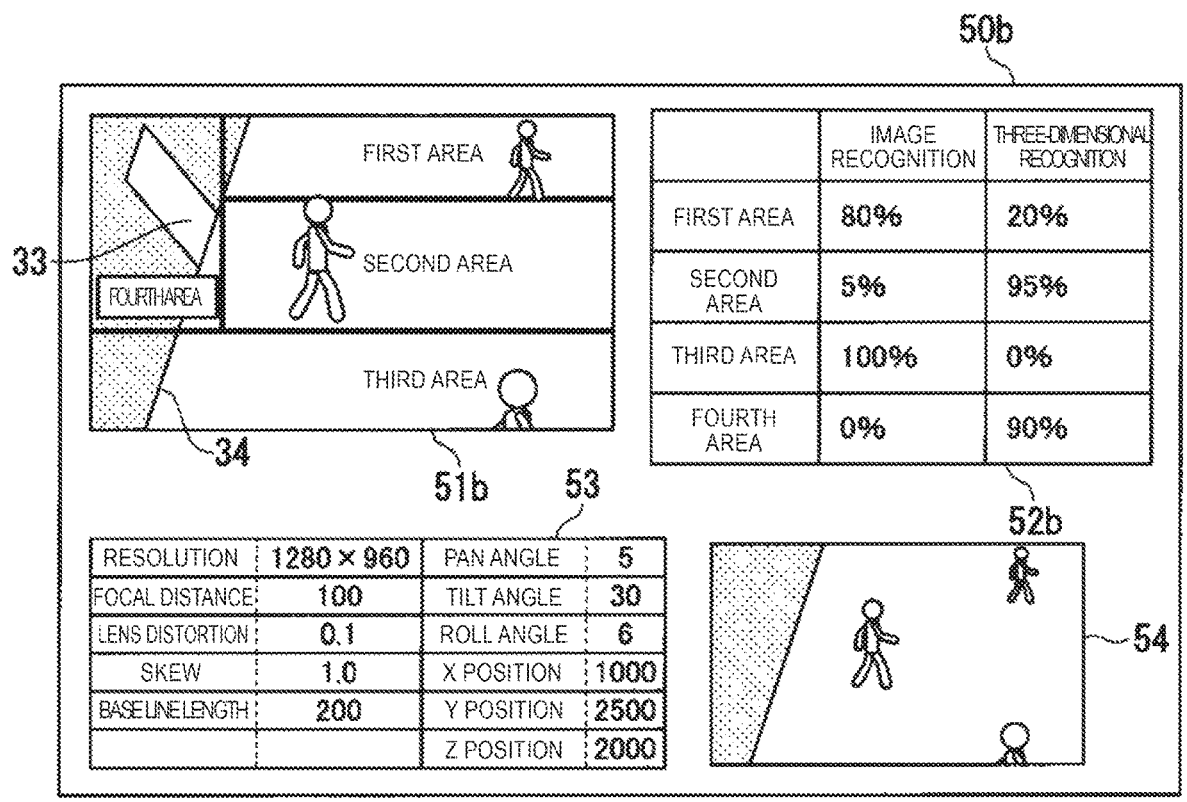

[Fig. 11]
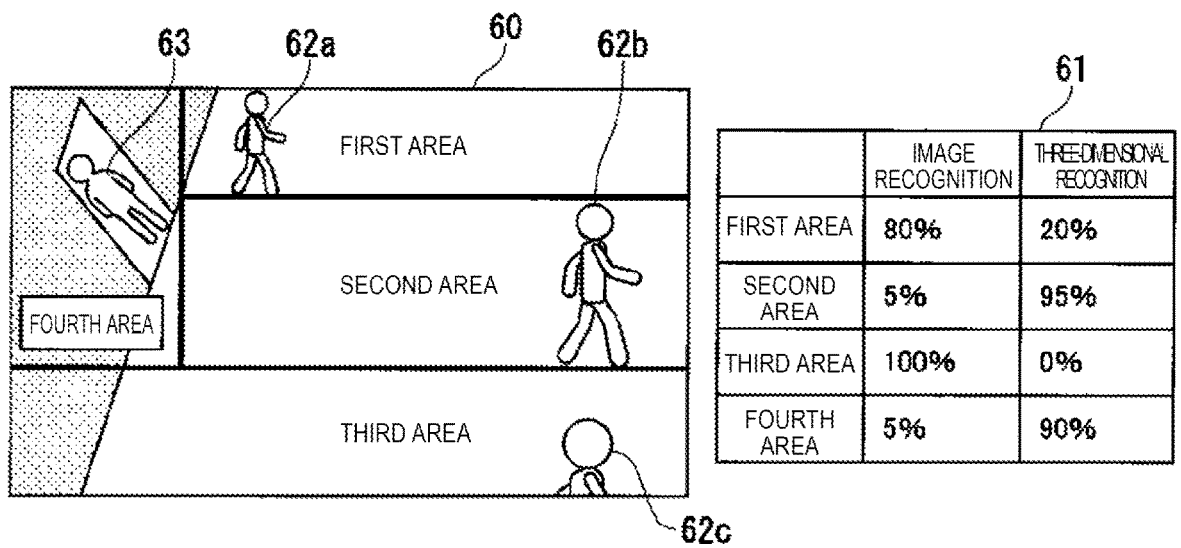

[Fig. 12]
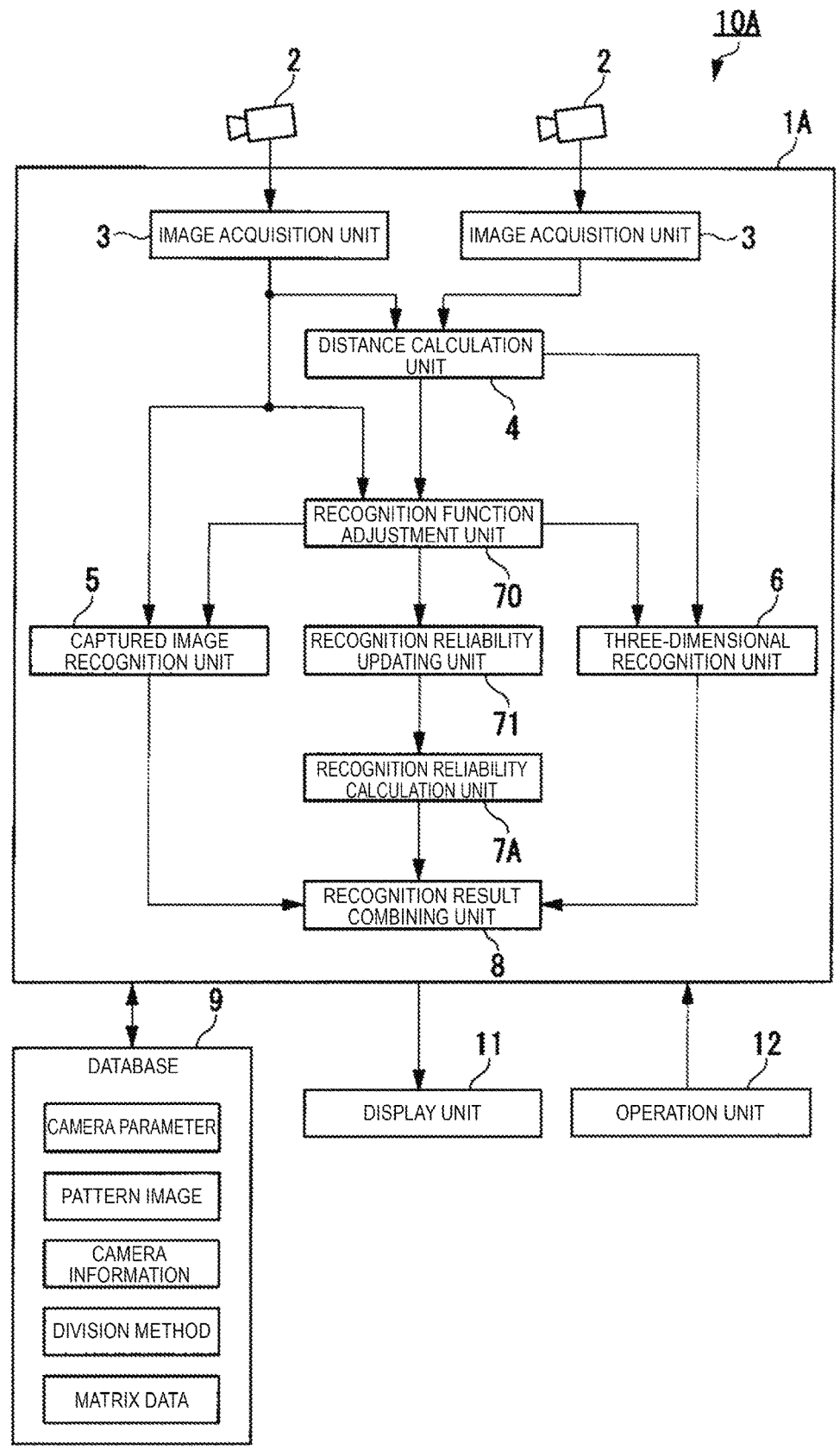

[Fig. 13]
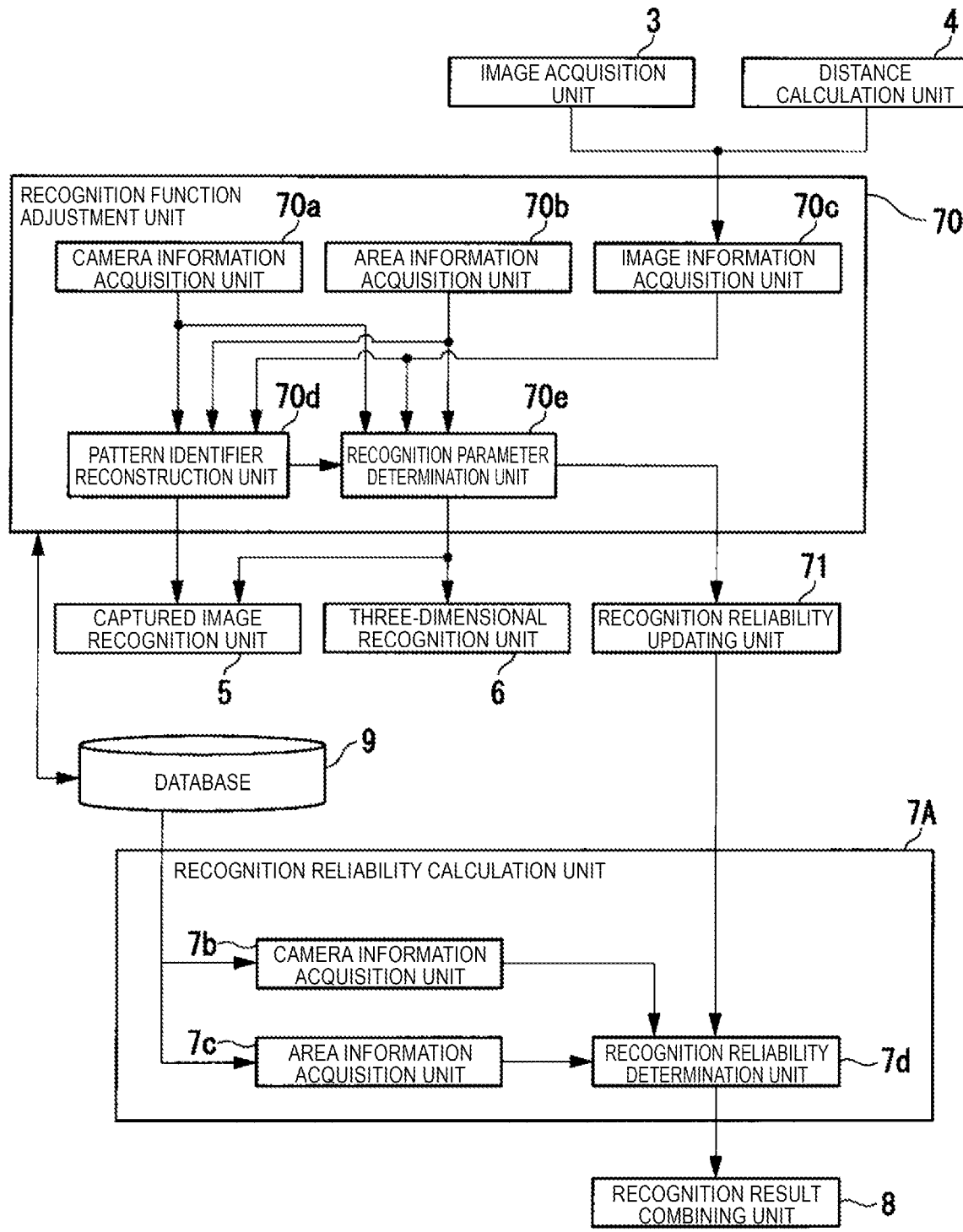

[Fig. 14]
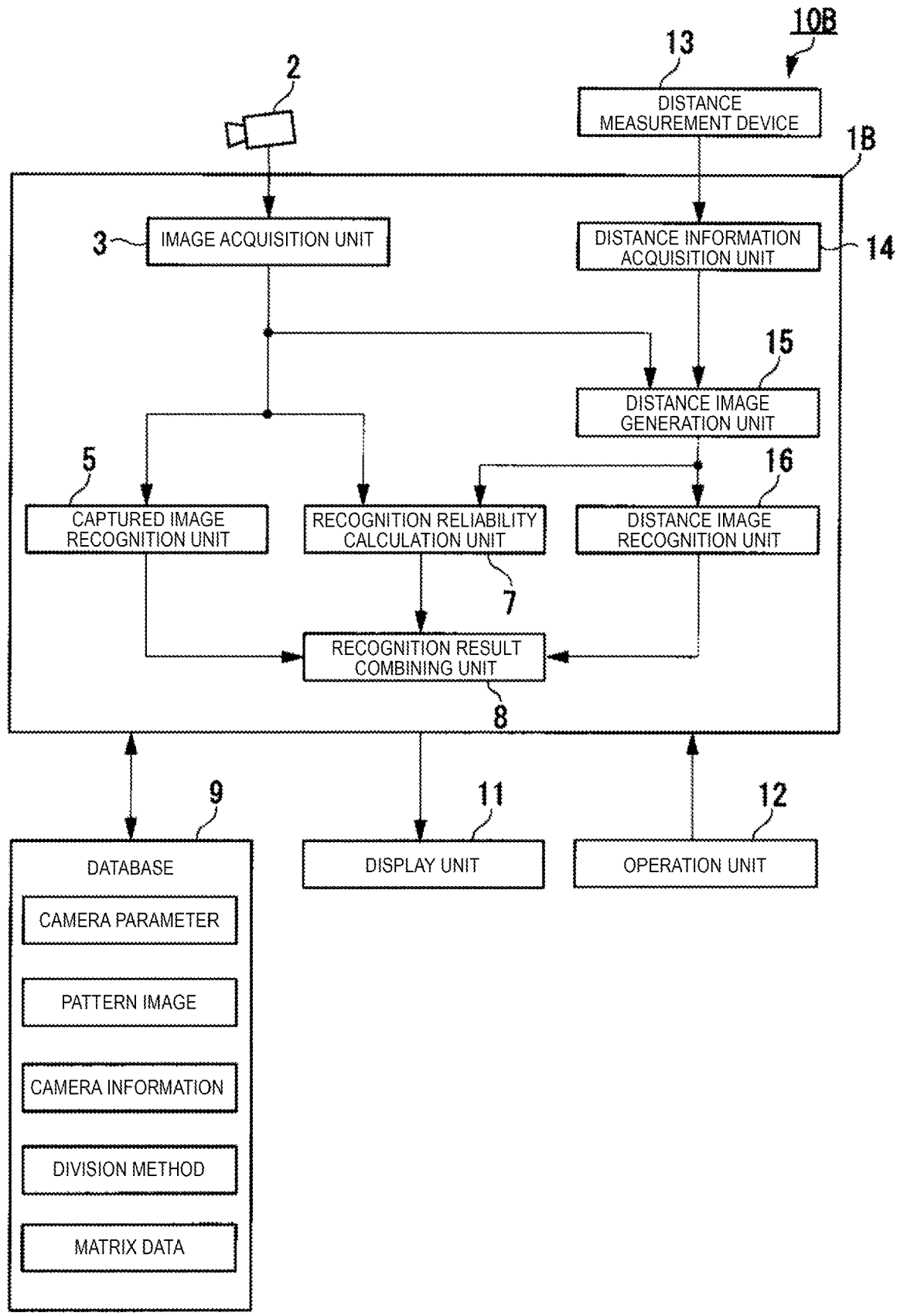

OBJECT RECOGNITION DEVICE AND OBJECT RECOGNITION SYSTEM

TECHNICAL FIELD

The present invention relates to, for example, an object recognition device and an object recognition system that recognize a specified object, based on information measured by a measurement device.

BACKGROUND ART

Recently, there is an increasing need for an object recognition technology for detecting an object, based on information measured by a measurement device. The measurement device is mounted on, for example, a car and is used for automatically recognizing an object (pedestrian or the like) existing in a travel direction of a car.

A monitoring camera, a distance sensor, a laser radar, an infrared tag, and the like are frequently used as a measurement device. Then, if introduction cost for newly installing the measurement device is not required and an existing measurement device can be used, it is possible to introduce an object recognition technology with lower cost. For this reason, development of a technology is underway in which an existing monitoring camera is used as a measurement device and an object is detected based on an image acquired from the monitoring camera. Then, as a technology for recognizing an object from an image, for example, a method of searching whether or not a portion similar to sample data exists in an image in a state where lots of sample data (sample images) of an object to be recognized is stored in a database in advance is generally used.

However, in a case where appearance of the object differs greatly from the sample data due to illumination conditions or the like, it is difficult to recognize an object by this method. Therefore, attention is paid to a technology for recognizing an object with high accuracy by capturing an image of an object using a plurality of cameras and measuring a three-dimensional shape of the object. For example, an object recognition technology which uses a stereo camera is used as such a technology. In this technology, a distance in a real space from the stereo camera to the object is calculated for each pixel of the image by using a parallax calculated by comparing a pair of left and right camera images captured by the stereo camera. Then, the object is recognized from the image by using three-dimensional information of the object measured based on the calculated distance information.

For example, PTL 1 is cited as an object recognition technology which uses a stereo camera. PTL 1 discloses that "an obstacle closer to a prescribed distance is recognized based on parallax information of the stereo camera and an obstacle farther than the prescribed distance is recognized by using pattern recognition".

CITATION LIST

Patent Literature

PTL 1: JP-A-2013-161187

SUMMARY OF INVENTION

Technical Problem

The technology disclosed in PTL 1 is an effective technology for a case where an in-vehicle stereo camera is used, an object is separated from the camera, and an image of the object is captured in right front of the camera. However, in a case where the stereo camera is installed in commercial facilities, a building, or the like, and an installation position and an installation angle of the camera differ from place to place. There is a high possibility that an object approaches the camera or a shape of the object changes greatly, depending on an installation environment of the camera. If a distance between the object and the camera is too short, the technology disclosed in PTL 1 cannot calculate the parallaxes at all, and thereby, it is impossible to recognize the object, based on the three-dimensional information, or to detect the object even by using a pattern matching due to the fact that a shape of the object changes.

The present invention is made in view of such situations, and aims to detect a specified object with high accuracy regardless of an installation environment of a measurement device or a position of the object.

Solution to Problem

An object recognition device according to the present invention includes a recognition unit, a recognition reliability calculation unit, and a combining unit.

A recognition unit recognizes an object by a plurality of methods, based on information which is obtained by measuring an object by a measurement device. A recognition reliability calculation unit calculates recognition reliability of recognition results that are obtained by recognizing an object by a recognition unit, for each method. A combining unit combines recognition reliability of an object and recognition results, detects a specified object, and outputs detection results of a specified object.

Advantageous Effects of Invention

According to the present invention, it is possible to detect a specified object with high accuracy by combining recognition reliability and recognition result of an object when the object is recognized by a plurality of methods.

Problems, configurations, and effects other than those described above will be clarified by the following description of the embodiments.

BRIEF DESCRIPTION OF DRAWINGS

FIG. 1 is a block diagram illustrating an internal configuration example of an object recognition system according to a first embodiment of the present invention.

FIG. 2 is a hardware configuration diagram of a calculator according to the first embodiment of the present invention.

FIG. 3 is a flowchart illustrating an example of processing in which a captured image recognition unit according to the first embodiment of the present invention detects a person from a captured image.

FIGS. 4A to 4D are explanatory diagrams illustrating an example of processing in which a three-dimensional recognition unit according to the first embodiment of the present invention detects a person from a parallax image.

FIG. 5 is a block diagram illustrating an internal configuration example of a recognition reliability calculation unit according to the first embodiment of the present invention.

FIG. 6 is an explanatory diagram illustrating an example of a captured image and a parallax image acquired by an image information acquisition unit according to the first embodiment of the present invention.

FIG. 7 is an explanatory diagram illustrating an example of camera information acquired by a camera information acquisition unit according to the first embodiment of the present invention, from a database.

FIG. 8 is an explanatory diagram illustrating a first example of camera information, an image-capturing range divided into three areas, and recognition reliability matrix data of each area according to the first embodiment of the present invention.

FIG. 9 is an explanatory diagram illustrating a second example of an image-capturing range divided into four areas and the recognition reliability matrix data of each area, according to the first embodiment of the present invention.

FIG. 10 is an explanatory diagram illustrating an example in which a recognition reliability determination unit according to the first embodiment of the present invention divides the image-capturing range into a plurality of areas and a GUI is used for finally determining the recognition reliability of each area.

FIG. 11 is an explanatory diagram illustrating a display example of a recognition sum value obtained by combining recognition reliability of image recognition and recognition reliability of three-dimensional recognition according to the first embodiment of the present invention.

FIG. 12 is block diagram illustrating an internal configuration example of an object recognition system according to a second embodiment of the present invention.

FIG. 13 is a block diagram illustrating an internal configuration example of a recognition function adjustment unit according to the second embodiment of the present invention.

FIG. 14 is a block diagram illustrating an internal configuration example of an object recognition system according to a third embodiment of the present invention.

DESCRIPTION OF EMBODIMENTS

Hereinafter, a form example for embodying the present invention will be described. In the present specification and the drawings, configuration elements having substantially the same function or configuration are denoted by the same symbols or reference numerals, and redundant explanations are omitted.

[1. First Embodiment]

FIG. 1 is a block diagram illustrating a configuration example of an object recognition system according to a first embodiment of the present invention.

The object recognition system 10 illustrated in FIG. 1 includes two cameras 2, an object recognition device 1, a database 9, a display unit 11, and an operation unit 12.

The object recognition device 1 includes an image acquisition unit 3, a distance calculation unit 4, a captured image recognition unit 5, a three-dimensional recognition unit 6, a recognition reliability calculation unit 7, and a recognition result combining unit 8. The object recognition device 1 recognizes objects in images captured by two adjacent cameras 2 (an example of measurement device) used as a stereo camera, and detects a specified object from the objects. The object recognition device 1 according to the present embodiment sets a person as a specified object that is a detection target, but a different object such as a vehicle may be set as the detection target.

The camera 2 converts an electric signal obtained by converting visible light acquired at a predetermined time period through a charge coupled device (CCD) imager or a complementary metal oxide semiconductor (CMOS) element, into a digital signal, and generates digital image data.

The image acquisition unit 3 acquires digital image data from the two cameras 2. In the following description, the digital image data acquired by the image acquisition unit 3 from the camera 2 is referred to as a "captured image". The captured image is used as an example of information obtained by measuring an object by the camera 2.

The distance calculation unit 4 calculates a distance in a real space to an object viewed from the camera 2, with respect to each pixel in the captured image. For example, the distance calculation unit 4 calculates a distance from the camera 2 o an object in the captured image, based on the captured images of the two cameras 2 output from the image acquisition unit 3 and camera parameters previously estimated by a known calibration technology in each camera 2. As a method of calculating the distance, for example, a general method called stereo matching for calculating parallax by using a basic matrix obtained from camera parameters is used. Then, the distance calculation unit 4 outputs a parallax image obtained by including distances, which are calculated for each object, to the objects viewed from the cameras 2 in captured images respectively acquired from the two cameras 2 as distance information, to the three-dimensional recognition unit 6 and the recognition reliability calculation unit 7. The parallax image is also used as an example of information obtained by measuring an object by the camera 2.

The captured image recognition unit 5 (an example of a recognition unit) recognizes an object, based on a captured image captured by one camera 2 of the two cameras 2. Details of processing performed by the captured image recognition unit 5 will be described below with reference to FIG. 3. In the following description, an object recognition function by which the captured image recognition unit 5 recognizes an object is also referred to as "image recognition".

The three-dimensional recognition unit 6 (an example of a recognition unit) recognizes an object, based on the distance information included in the parallax image. Details of the processing performed by the three-dimensional recognition unit 6 will be described below with reference to FIG. 4. In the following description, an object recognition function by which the three-dimensional recognition unit 6 recognizes an object is also referred to as "three-dimensional recognition".

The recognition reliability calculation unit 7 calculates reliability of image recognition and recognition reliability of three-dimensional recognition for each object recognition function, based on camera information of the camera 2 and an installation environment of the camera 2. In addition, the recognition reliability calculation unit 7 can also calculate recognition reliability for each area, based on the camera information that a user changes by the operation unit 12, a division method, and the recognition reliability which are acquired from the database 9.

The camera information is information including at least one of installation environment and internal information of the camera 2. The camera information may include an image-capturing range and a distance from the camera 2 to an object. The recognition reliability is a value indicating reliability of recognition results that the captured image recognition unit 5 and the three-dimensional recognition unit recognize a specified object, based on each object recognition function, and the higher the recognition reliability is, the easier the recognition results are to be reflected in detection results of the specified object displayed on the display unit 11. Details of processing performed by the recognition reliability calculation unit 7 will be described below with reference to FIGS. 5 and 6.

The recognition result combining unit 8 (an example of a combining unit) combines recognition reliability of an object recognition function by which the captured image recognition unit 5 and the three-dimensional recognition unit 6 recognize an object, recognition results of the captured image recognition unit 5, and recognition results of the three-dimensional recognition unit 6, and detects a specified object. Then, the recognition result combining unit 8 outputs detection results of the specified object to the display unit 11.

The database 9 records camera parameters, pattern images, camera information peculiar to each camera 2, an image-capturing range division method, recognition reliability matrix data, and the like read which are output from the image acquisition unit 3, and the information is frequently read from each unit of the object recognition device 1. The detection result of the object recognition device 1 are recorded in the database 9.

The display unit 11 displays the detection results of the specified object detected by the recognition result combining unit 8. Details of the recognition results displayed on the display unit 11 will be described below with reference to FIGS. 10 and 11. The display unit 11 is, for example, a liquid crystal display monitor, and displays results of processing through a graphical user interface (GUI).

The operation unit 12 is used by the user to perform predetermined operation inputs and instructions to the object recognition device 1. For example, a keyboard, a mouse, or the like is used for the operation unit 12. The camera information, the division method, and the recognition reliability can be changed by an input of the user from the operation unit 12 through the GUI displayed on the display unit 11. The camera information, the division method, and the recognition reliability which are changed are recorded in the database 9.

<Hardware Configuration Example of Calculator>

Next, a hardware configuration of a calculator C configuring the object recognition device 1 will be described.

FIG. 2 is a block diagram illustrating a hardware configuration example of the calculator C.

The calculator C is hardware used as a so-called computer. The calculator C includes a central processing unit (CPU) C1, a read only memory (ROM) C2, a random access memory (RAM) C3, a nonvolatile storage C5, and a network interface C6, which are connected to a bus C4.

The CPU C1 reads a software program code for realizing each function according to the present embodiment from the ROM C2 and executes the software program code. Variables, parameters, and the like which are generated during arithmetic processing are temporarily written to the RAM C3.

For example, a hard disk drive (HDD), a solid state drive (SSD), a flexible disk, an optical disk, a magneto-optical disk, a CD-ROM, a CD-R, a magnetic tape, a nonvolatile memory card, and the like are used as the nonvolatile storage C5. In addition to an operating system (OS) and various parameters, a program for causing the calculator C to function is recorded in the nonvolatile storage C5. For example, a network interface card (NIC) and the like are used for the network interface C6, and various data can be transmitted and received via a local area network (LAN) to which a terminal is connected, a dedicated line, and the like.

A function of the object recognition device 1 is realized by the calculator C, but the function of the object recognition device 1 may be realized by configuring the camera 2 itself using the calculator C.

FIG. 3 illustrates an example of processing in which the captured image recognition unit 5 detects a person from a captured image.

First, the captured image recognition unit 5 learns a feature pattern (for example, an outline of a head and a shoulder of a person) in a two-dimensional captured image such as a color and a shape from sample data (sample image) of a person read from the database 9, and generates a pattern identifier (S1). Next, the captured image recognition unit 5 comprehensively scans the captured image by a detection window (for example, a rectangular area smaller than the captured image), and extracts a local feature part from the captured image (S2).

Next, the captured image recognition unit 5 uses the pattern identifier generated in step S1 to calculate a matching degree (an example of recognition results) between the local feature part extracted from the captured image and an image feature of the pattern identifier (S3), and outputs the calculated matching degree to the recognition result combining unit 8. If the matching degree of the image feature calculated in step S3 is equal to or larger than a specified value, the captured image recognition unit 5 determines that a person is captured in an image, and if the matching degree is less than the specified value, the captured image recognition unit 5 determines that a person is not captured in the image.

The above-described image recognition method performed by the captured image recognition unit 5 is based on an application of a general learning type object recognition technique. In addition to this method, as long as a method can detect a person from a captured image, the method is not limited in particular.

FIG. 4 illustrates an example of processing in which the three-dimensional recognition unit 6 detects a person from a parallax image.

FIG. 4A illustrates an example of a parallax image 22.

The parallax image 22 includes a distance value from the camera 2 to each object captured in the image for each pixel. For example, persons 20a to 20c which are detection targets and a building 21 which is not the detection target are captured in the parallax image 22. Then, the three-dimensional recognition unit 6 performs processing of recognizing the persons 20a to 20c which are detection targets from the parallax image 22.

FIG. 4B illustrates an outline of processing performed by the three-dimensional recognition unit 6.

The three-dimensional recognition unit 6 extracts regions of the persons 20a to 20c by background subtraction processing. Here, the three-dimensional recognition unit 6 reads a background parallax image 23 previously acquired from the database 9. Only the building 21 exists in the background parallax image 23. Accordingly, by taking a difference between the parallax image 22 where a person exists and the background parallax image 23, the three-dimensional recognition unit 6 can create a parallax image 24 including a person region where the person exists. Positions of the persons 20a to 20c in the parallax image 24 are specified by image coordinates including x (a position in the x direction in the parallax image 24), y (a position in the y direction in the parallax image 24), and L (a distance of a depth from the camera 2 to the object).

FIG. 4C illustrates an example of first viewpoint conversion processing.

The three-dimensional recognition unit 6 acquires three-dimensional information of each person distinguished from the person region by performing the first viewpoint conversion processing.

FIG. 4C illustrates image coordinates of the parallax image 24, three-dimensional information 25 in which a person estimated from the distance information is oblique, and an overhead view image 26 obtained by viewing the three-dimensional information 25 from right above viewpoint. The overhead view image 26 is created from the three-dimensional information 25 by a general method such as a perspective projection which uses camera parameters. A three-dimensional information template t1 for specifying the persons 20a to 20c is illustrated in the lower left of the overhead view image 26. The three-dimensional information template t1 is read from the database 9 by the three-dimensional recognition unit 6.

For example, the three-dimensional recognition unit 6 comprehensively scans the three-dimensional information template t1 in a direction indicated by an arrow in the overhead view image 26, thereby, specifying an image matching the three-dimensional information template t1 as the persons 20a to 20c. Then, the three-dimensional recognition unit 6 calculates a matching degree (an example of recognition results) between the three-dimensional information template t1 and the three-dimensional information of a person captured in the overhead view image 26, and outputs the calculated matching degree to the recognition result combining unit 8. At this time, if the matching degree is equal to or larger than the specified value, the three-dimensional recognition unit 6 can determine that a person is captured in the overhead view image 26, and if the matching degree is less than the specified value, the three-dimensional recognition unit 6 can determine that the person is not captured in the overhead view image 26.

FIG. 4D illustrates an example of second viewpoint conversion processing.

The three-dimensional recognition unit 6 does not create the overhead view image 26 rom the three-dimensional information 25 of all objects illustrated in FIG. 4C, can create three-dimensional information 27 in which only the head of a person extracted from the person region is oblique is created as illustrated in FIG. 4D, and can also create the overhead view image 28 from the three-dimensional information 27. Through such processing, the three-dimensional recognition unit 6 can easily divide persons from each other as compared with the overhead view image 26 generated from the three-dimensional information of all persons.

Then, in the same manner as the first viewpoint conversion processing, the three-dimensional recognition unit 6 calculates a matching degree between the three-dimensional information template t2 of the head read from the database 9 and the heads of each person, and outputs the calculated matching degree to the recognition result combining unit 8. Then, the three-dimensional recognition unit 6 can detect a person with high accuracy even in a scene where persons are crowded.

As a method of extracting the three-dimensional information 27 of only the head from the person region, there is a method of detecting three-dimensional information above from a certain height above a plane as the head. Besides, as long as a method can extract a region near the head, the method is not limited in particular.

In addition to the above-described method, the three-dimensional recognition unit 6 can use a method capable of detecting a person from three-dimensional information. For example, the three-dimensional recognition unit 6 may use a method of detecting a person by using not only the three-dimensional information but also image features. In addition, in the same manner as the captured image recognition unit 5, the three-dimensional recognition unit 6 may use a method of detecting a person by creating a pattern identifier from the three-dimensional information of a person which is sample data read from the database 9, and calculating a matching degree between the acquired three-dimensional information and the sample data.

FIG. 5 is a block diagram illustrating an internal configuration example of the recognition reliability calculation unit 7.

The recognition reliability calculation unit 7 illustrated in FIG. 5 calculates recognition reliability of an object recognized by the captured image recognition unit 5 and recognition reliability of an object recognized by the three-dimensional recognition unit 6, for each area obtained by dividing an image-capturing range of a captured image, based on camera information read from the database 9.

The recognition reliability calculation unit 7 includes an image information acquisition unit 7a, a camera information acquisition unit 7b, an area information acquisition unit 7c, and a recognition reliability determination unit 7d.

The image information acquisition unit 7a acquires a captured image from the image acquisition unit 3, acquires a parallax image from the distance calculation unit 4, and outputs the captured image and the parallax image to the recognition reliability determination unit 7d.

The camera information acquisition unit 7b (an example of a measurement device information acquisition unit) acquires camera information (an example of measurement device information) including an installation angle, a focal length, and the like of the camera 2 from the database 9. Then, the camera information acquisition unit 7b outputs the acquired camera information to the recognition reliability determination unit 7d.

The area information acquisition unit 7c acquires an image-capturing range division method corresponding to the camera information and recognition reliability matrix data, from the database 9 for each area, and outputs the image-capturing range division method and the recognition reliability matrix data to the recognition reliability determination unit 7d.

The recognition reliability determination unit 7d divides the image-capturing range of the camera 2 into areas with a predetermined position and a predetermined size, based on the captured image and the parallax image, the camera information, the image-capturing range division method and the recognition reliability matrix data. Then, the recognition reliability determination unit 7d determines the recognition reliability of the captured image and the recognition reliability of the parallax image for each of the divided areas, and outputs the determined recognition reliability for each area to the recognition result combining unit 8.

FIG. 6 illustrates an example of a captured image 30 and a parallax image 31 which are acquired by the image information acquisition unit 7a.

Persons 32a to 32c as an example of objects, a mirror 33, and a wall 34 are captured in the captured image 30. Meanwhile, the persons 32a to 32c as an example of objects, and the wall 34 are also captured in the parallax image 31, but the mirror 33 is not captured. This is due to a difference in properties between the captured image 30 and the parallax image 31. In the parallax image 31, if the camera 2 is taken as a reference, a difference in luminance value at a boundary between objects located far away is reduced. However, in the captured image 30, the difference in luminance value does not change even at the boundary between objects located far away. Accordingly, the mirror 33 and the wall 34 can be distinguished from each other in the captured image 30, but the mirror 33 and the wall 34 cannot be distinguished from each other in the parallax image 31.

FIG. 7 illustrates an example in which the camera information acquisition unit 7b acquires the camera information from the database 9.

The camera information is divided into two pieces of internal information of the camera 2 and an installation environment of the camera 2. In a case where two cameras 2 are used as a stereo camera, the internal information of the camera 2 includes a baseline length between the left and right cameras 2, and the like, in addition to internal parameters such as, a resolution, a focal distance, lens distortion, and skew. The installation environment of the camera 2 includes external parameters such as an installation angle (a pan angle, a tilt angle, a roll angle) of the camera 2 and an installation position (X position, Y position, Z position) of the camera 2.

The camera information acquisition unit 7b may acquire camera information other than that illustrated in FIG. 7, as long as the camera information affects a change in a shape and appearance of an object in the image. In addition, the camera information acquisition unit 7b may acquire camera information manually instructed by a user using a GUI or the like, or may acquire camera information estimated by using a calibration technology of a captured image or a parallax image.

FIG. 8 illustrates a first example of the camera information, the image-capturing range divided into three areas, and the recognition reliability matrix data of each area.

The same camera information as that illustrated in FIG. 7 is stored in the camera information 40 acquired by the area information acquisition unit 7c. Then, the division method illustrates how to divide the image-capturing range, corresponding to the camera information 40. It is illustrated by the division method 41 that the image-capturing range is divided into three areas of first to third areas. Matrix data 42 illustrated in a list illustrates reliability of image recognition and reliability of three-dimensional recognition for each of the first to third areas.

The division method 41 of an image-capturing range and the recognition reliability matrix data 42 may be changed according to algorithms used for image recognition and three-dimensional recognition. For example, in an object recognition function which uses templates of all persons, recognition reliability is close to "0" in an area where an image of the whole body is not captured and in areas of left and right ends of an image whose shape is largely changed due to lens distortion or the like, but the recognition reliabilities of the center of an image where the whole body is reflected and a distant part of the image are high. Meanwhile, in the image recognition using the template of a part of the human body, a person can be detected in the entire area of the image-capturing range, but recognition reliability decreases as compared with image recognition which uses templates of all persons. Accordingly, depending on what kind of template is used to perform the image recognition, the image-capturing range is appropriately divided, and the contents of the matrix data 42 are changed.

In addition, for the recognition reliability matrix data, a total value of the recognition reliability of two object recognition functions may not always be set to "100" like the matrix data 42, and the value may not be limited to a range of "0" to "100". For example, in a case where the recognition reliability is extremely high, the total value of the recognition reliability of the two object recognition functions may be set to a value such as "200". Depending on the image-capturing range, one object recognition technology may be used by setting the recognition reliability of one of the two object recognition technologies to "0".

FIG. 9 illustrates a second example of an image-capturing range divided into four areas and the recognition reliability matrix data of each area. In FIG. 9, description of the camera information 40 is omitted.

A division method 43 of the image-capturing range acquired by the area information acquisition unit 7c is to divide the image-capturing range into four areas of first to fourth areas in accordance with a distance from the camera 2. The matrix data 44 illustrates recognition reliability of the image recognition and the three-dimensional recognition for each of the first to fourth areas. The division method 43 of the image-capturing range and the recognition reliability matrix data 44 may be changed in accordance with distance information from the camera 2 which is acquired from the parallax image.

The image-capturing range division method is not limited only to the division in the vertical direction as illustrated in FIGS. 8 and 9, and a method of dividing the image-capturing range in the horizontal direction or in a ring shape may be used. Depending on the camera information, the image-capturing range may not necessarily be divided, but the entire image-capturing range may be set as one area.

FIG. 10 is an example in which the recognition reliability determination unit 7d divides the image-capturing range into a plurality of areas and a GUI is used for finally determining the recognition reliability of each area. All screens 50a and 50b illustrated in FIG. 10 are displayed on the display unit 11.

The recognition reliability determination unit 7d associates the camera information acquired from the camera information acquisition unit 7b with the image-capturing range division method and the recognition reliability matrix data which are acquired from the area information acquisition unit 7c, and displays the results on the display unit 11 as the entire screen 50a.

In addition to a captured image 51a divided by the recognition reliability determination unit 7d into first to third areas on the basis of the division method of the image-capturing range, matrix data 52a, camera information 53 and parallax image 54 are displayed on the entire screen 50a.

The captured image 51a is an image acquired by the image information acquisition unit 7a and is the same as the captured image 30 illustrated in FIG. 6.

The matrix data 52a is information indicating the recognition reliability of an object recognition function for each of the divided areas as illustrated in FIGS. 8 and 9.

The camera information 53 is information acquired by the camera information acquisition unit 7b and has the same content as the camera information illustrated in FIG. 7.

The parallax image 54 is an image acquired by the image information acquisition unit 7a and is the same as the parallax image 31 illustrated in FIG. 6.

A user views entirety of the captured image 51a and confirms how an image-capturing range of the captured image 51a is divided by the division method 41. Then, the user modifies an image-capturing range division method and the recognition reliability for each area, by the operation unit 12, based on content of a captured image. The entire screen 50b illustrates an example in which the user modifies the image-capturing range division method and the matrix data 52a.

Here, as illustrated in the entire screen 50*a*, the mirror 33 exists in the captured image 51*a* acquired by the image information acquisition unit 7*a*, in addition to a person. Since the three-dimensional recognition unit 6 recognizes an object, based on the parallax image 54 in which the mirror 33 and the wall 34 are not distinguished as illustrated in FIG. 6, there is a low possibility of detecting a person displayed on the mirror 33. However, since the captured image recognition unit 5 recognizes an object, based on the feature of an image in the captured image 51*a*, there is a high possibility of erroneously detecting a person displayed on the mirror 33.

Therefore, a user performs an input from the operation unit 12 through the GUI, and creates the captured image 51*b* obtained by dividing a new area (fourth area) surrounding the mirror 33 from the captured image 51*a*. Then, the user modifies the recognition reliability of image recognition in the fourth area which is added to the matrix data 52*b* to 0% and recognition reliability of three-dimensional recognition which is added to the matrix data 52*b* to 90%. Thereby, for an object displayed on the fourth area, recognition results of three-dimensional recognition have higher reliability than recognition results of image recognition.

As a method by which a user modifies the recognition reliability of an area, for example, there is a method of dividing an area of a part expected to have large variation in lighting conditions, and modifying such that the recognition reliability of image recognition in the area is decreased and the recognition reliability of three-dimensional recognition is significantly increased. In addition, there is also a method of decreasing reliability of the three-dimensional recognition at a part where parallax is not sufficiently obtained by the parallax image 54.

In addition, it is also possible for a user to perform an input from the operation unit 12 via the GUI and to modify a value of the camera information 53. If the camera information 53 is modified by the user, the area information acquisition unit 7*c* acquires the image-capturing range division method and recognition reliability matrix data of each area, based on the modified camera information 53. Accordingly, content of the captured images 51*a* and 51*b* and the matrix data 52*a* and 52*b* are automatically updated.

In addition, various methods are used to associate the camera information acquired by the camera information acquisition unit 7*b* with the image-capturing range division method and the recognition reliability matrix data which are acquired by the area information acquisition unit 7*c*. For example, there is a method by which the area information acquisition unit 7*c* uses the database 9 in which the image-capturing range division method and the recognition reliability matrix data are previously stored for every camera information acquired by the camera information acquisition unit 7*b*. In addition, there is also a method of using the database 9 in which the image-capturing range division method and the recognition reliability matrix data are previously stored for each distance from the camera 2 to an object. Thereby, the area information acquisition unit 7*c* can acquire the image-capturing range division method and the recognition reliability matrix data from the database 9 only by acquiring the camera information acquired by the camera information acquisition unit 7*b*, without requiring association of various types of information performed by the recognition reliability determination unit 7*d*.

In addition, the area information acquisition unit 7*c* may use the database 9 in which distance information acquired from a parallax image is associated with the image-capturing range division method and the recognition reliability matrix data. In addition, the area information acquisition unit 7*c* may be the image-capturing range division method and the recognition reliability matrix data associated with both the camera information and the distance information of the camera 2. Then, a user may be able to select the image-capturing range division method and the recognition reliability matrix data corresponding to the camera information through the GUI.

In addition, the user may use the distance information through the GUI and change the recognition reliability in accordance with a distance. For example, a user may increase recognition reliabilities of image recognition and three-dimensional recognition at a near area, and decrease the recognition reliabilities of the image recognition and the three-dimensional recognition at a distant area.

In addition, the image-capturing range division method and image recognition reliability matrix data are associated with the image information (the captured image and the parallax image) acquired by the image information acquisition unit 7*a* to be stored in advance in the database 9. The recognition reliability calculation unit 7 collates the captured image acquired by the image information acquisition unit 7*a* using a similar image searching technology or the like with the image information stored in the database 9. Then, the recognition reliability calculation unit 7 reads the image-capturing range division method and the image recognition reliability matrix data which are associated with the matched image information, from the database 9. Thereby, the area information acquisition unit 7*c* can acquire the image-capturing range division method and the image recognition reliability matrix data from the database 9 without using the camera information.

In addition, when a user divides an image-capturing range into a plurality of areas through the GUI, the recognition reliability calculation unit 7 may search the database 9 for an image-capturing range division method similar to the image-capturing range division method performed by a user, based on input information input from the operation unit 12 and the camera information. Then, the recognition reliability calculation unit 7 may acquire the most similar image-capturing range division method and recognition reliability matrix data corresponding to the division method from the database 9, and may display the recognition reliability matrix data on the display unit 11.

FIG. 11 illustrates a display example of a recognition sum value obtained by combining recognition reliability of image recognition and recognition reliability of three-dimensional recognition. The GUI illustrated in FIG. 11 is displayed on the display unit 11.

Actual captured image 60, recognition reliability matrix data 61, and a recognition result list 64 are displayed in the GUI illustrated in FIG. 11. The captured image 60 is divided into first to fourth areas by the recognition reliability calculation unit 7. An object 62*a* is included in the first area, an object 62*b* is included in the second area, an object 62*c* is included in the third area, and an object 63 is included in the fourth area.

The recognition reliability of image recognition of the first to fourth areas and the recognition reliability of three-dimensional recognition are displayed in the matrix data 61. Then, a matching degree between objects recognized by the captured image recognition unit 5 and the three-dimensional recognition unit 6 in the first to fourth areas, the recognition reliability of image recognition, the recognition reliability of three-dimensional recognition, and the recognition sum value are displayed in the recognition result list 64.

Here, the recognition result combining unit 8 combines a degree indicating that an object recognized by the captured image recognition unit 5 from a captured image is a specified object and the recognition reliability for recognizing an object in the captured image. In addition, the recognition result combining unit 8 combines a degree indicating that an object recognized by the three-dimensional recognition unit 66 from the parallax image is a specified object and the recognition reliability for recognizing an object in the parallax image. Then, in a case where a recognition sum value calculated by combining a matching degree of image recognition and a matching degree of three-dimensional recognition, based on the recognition reliability is equal to or larger than a predetermined value, the recognition result combining unit 8 sets the specified object to the detection results (indicating presence or absence of a person displayed in the captured image 60).

$$\begin{aligned}\text{Recognition sum value} = \quad &\text{(matching degree of image recognition)} \times \\ &\frac{\text{(recognition reliability of image recognition)}}{100} + \\ &\text{(matching degree of three-dimensional recognition)} \times \\ &\frac{\text{(recognition reliability of three-dimensional recognition)}}{100}\end{aligned} \quad (1)$$

A matching degree of image recognition or three-dimensional recognition in the recognition result list 64 is normalized between "0" and "10". A method of normalizing the matching degree is not limited. The recognition result combining unit 8 finally obtains recognition results of a person by determining that, if a value equal to or larger than a preset appropriate threshold value is illustrated, the recognized object is a person, and if a value less than the threshold value is illustrated, the recognized object is not a person, by using the recognition sum value. For example, by setting the threshold value to "3" among the recognition sum values illustrated in FIG. 11, only the objects 62*a*, 62*b*, and 62*c* are detected as persons, and the object 63 reflected in the mirror is detected to be not a person.

In an algorithm of the image recognition or the three-dimensional recognition used by the captured image recognition unit 5 or the three-dimensional recognition unit 6, there is a case where a matching degree cannot be calculated and instead it is possible to acquire only whether or not a person exists. In this case, the recognition result combining unit 8 may obtain the recognition sum value by setting a matching degree in a case where a person exists to "10" and a matching degree in a case where a person does not exist to "0".

In addition, the recognition result combining unit 8 may select only results of an object recognition function with high recognition reliability for each area instead of combining results of two object recognition functions.

The object recognition device 1 described above recognizes combines recognition results of the image recognition and the three-dimensional recognition by using the camera information of the two cameras 2, the image-capturing range division method and the matrix data storing the recognition reliability of each area. Thereby, the object recognition device 1 can detect a specified object with high accuracy regardless of an installation environment of the camera 2 or a position of an object.

In addition, when a specified object is near the camera 2, the object recognition device 1 can detect the specified object from an object recognized based on a captured image. In addition, when a specified object is far from the camera 2, the object recognition device 1 can detect the specified object from an object recognized based on a parallax image.

In the first embodiment, an example of a case where a stereo camera is used as a measurement device, and an image recognition in which an image is used and three-dimensional recognition in which distance information is used are used as an object recognition method is described, but the first example is not limited to the measurement device and the object recognition method.

Even if heights of the two cameras 2 and a distance to the object change, the recognition reliability calculation unit 7 corrects a captured image and a parallax image so as to be in the same image-capturing range, based on camera information of the two cameras 2 read from the database 9. Accordingly, it is possible to easily construct the object recognition system 1 by using the existing cameras 2.

In addition to using the two cameras 2 which are measurement devices as adjacent stereo cameras, the object recognition device 1 may acquire image information of an object and distance information by using three or more cameras 2, and may perform a series of processing. In this case, since a range of the captured image and the parallax image recognized by the object recognition device 1 is enlarged, it is possible to detect a specified object from a wide range.

In addition, in the first embodiment, an example is described in which two object recognition functions are used as an object recognition technology, but the number and the type of object recognition functions to be used are not limited. For example, in a case where a person is detected as a specified object, three object recognition functions of a function of detecting a head by using image recognition, a function of detecting a person by using the image recognition, and a function of performing three-dimensional recognition by using distance information may be used in combination.

[2. Second Embodiment]

Next, an object recognition system according to a second embodiment of the present invention will be described.

FIG. 12 illustrates an internal configuration example of an object recognition system 10A according to the second embodiment.

The object recognition system 10A includes two cameras 2, an object recognition device 1A, a database 9, a display unit 11, and an operation unit 12.

In addition to the image acquisition unit 3, the distance calculation unit 4, the captured image recognition unit 5, the three-dimensional recognition unit 6, the recognition reliability calculation unit 7A, and the recognition result combining unit 8, the object recognition device 1A includes a recognition function adjustment unit 70 and a recognition reliability updating unit 71.

The recognition function adjustment unit 70 adjusts a parameter (a function of the captured image recognition unit to recognize an object) used when the captured image recognition unit 5 recognizes an object, based on camera information. In addition, the recognition function adjustment unit 70 adjusts a parameter (an example of a function of the three-dimensional recognition unit 6 to recognize an object) used when the three-dimensional recognition unit 6 recognizes an object, based on the camera information.

The recognition reliability updating unit 71 updates matrix data in which recognition reliability for each divided range of an image-capturing range is stored, based on the parameter adjusted by the recognition function adjustment unit 70. The updated matrix data is recorded in the database 9. Hereinafter, details of functions of the recognition function adjustment unit 70 and the recognition reliability updating unit 71 will be described.

FIG. 13 illustrates an internal configuration example of the recognition function adjustment unit 70.

Here, a function of adjusting a parameter of an object recognition function by the recognition function adjustment unit 70 will be described.

The recognition function adjustment unit 70 includes a camera information acquisition unit 70a, an area information acquisition unit 70b, an image information acquisition unit 70c, a pattern identifier reconstruction unit 70d, and a recognition parameter determination unit 70e.

The camera information acquisition unit 70a acquires camera information of the camera 2 from the database 9, and outputs the camera information to the pattern identifier reconstruction unit 70d and the recognition parameter determination unit 70e.

The area information acquisition unit 70b acquires an image-capturing range division method and recognition reliability matrix data of the camera 2, which are associated with the camera information acquired from the database 9. Then, the area information acquisition unit 70b outputs the image-capturing range division method and the recognition reliability matrix data of the camera 2 to the pattern identifier reconstruction unit 70d and the recognition parameter determination unit 70e.

The image information acquisition unit 70c acquires a captured image from the image acquisition unit 3, acquires a parallax image from the distance calculation unit 4, and outputs the captured image and the parallax image to the pattern identifier reconstruction unit 70d and the recognition parameter determination unit 70e.

The pattern identifier reconstruction unit 70d performs predetermined processing by using the captured image and the parallax image acquired by the image information acquisition unit 70c, the camera information acquired by the camera information acquisition unit 70a, and the image-capturing range division method and the recognition reliability matrix data acquired by the area information acquisition unit 70b. At this time, the pattern identifier reconstruction unit 70d reconstructs a pattern identifier used by the captured image recognition unit 5 by changing sample data (sample image) used by the captured image recognition unit 5, and records the pattern identifier in the database 9. The captured image recognition unit 5 according to the first embodiment described above generates the pattern identifier, but the captured image recognition unit 5 according to the present embodiment reads the pattern identifier reconstructed by the pattern identifier reconstruction unit 70d from the database 9, and uses the pattern identifier for processing.

The database 9 records in advance sample data for each installation environment of the camera 2 such as a height or an installation angle of the camera 2. Then, the pattern identifier reconstruction unit 70d changes to sample data of an installation environment most similar to the camera information (installation environment of the camera 2) acquired by the camera information acquisition unit 70a. The pattern identifier reconstruction unit 70d may perform scene recognition and the like, based on a captured image or a parallax image, and may change the scene recognition and the like into sample data close to the installation environment of the camera 2.

In addition to this, one piece of sample data is recorded in the database 9, and the sample data may be changed by performing distortion correction processing and the like with respect to an image in the sample data by the pattern identifier reconstructing unit 70d, based on the camera information such as lens distortion or a focal distance of the camera 2. In addition, the sample data may be changed by image processing such as changing a size of the image in the sample data or the like by the pattern identifier reconstructing unit 70d, based on distance information acquired from a parallax image.

In addition, the pattern identifier reconstruction unit 70d may reconstruct a pattern classifier for each of the divided areas, based on an image-capturing range division method and recognition reliability information which are associated with the camera information. When the three-dimensional recognition unit 6 performs three-dimensional recognition, in a case where a pattern identifier of the three-dimensional information created from the sample data is used as a three-dimensional information template, the pattern identifier reconstruction unit 70d may reconstruct a pattern identifier of the three-dimensional information.

The recognition parameter determination unit 70e changes parameters of an algorithm by which the captured image recognition unit 5 performs image recognition and the three-dimensional recognition unit 6 performs three-dimensional recognition, based on a reconstructed pattern identifier, camera information, a captured image, a parallax image, an image-capturing range division method, and recognition reliability.

As a method by which the recognition parameter determination unit 70e changes parameters of a recognition algorithm, there is a method of changing a parameter that determines a size or a shape of a detection window based on camera information such as a depression angle of the camera 2 and lens distortion.

In addition, as a method of changing the parameter, the recognition parameter determination unit 70e first performs scene recognition and the like, based on the captured image and the parallax image, and determines a position where an object constantly having movement of an image such as an escalator exists within an image-capturing range, a place where a sunlight change is large, and the like. Then, there is a method in which the recognition parameter determination unit 70e adjusts a parameter used when a matching degree between a local feature part in an image and an image feature of a pattern identifier is calculated, by the pattern identifier such that erroneous detection is reduced.

As an example in which the recognition parameter determination unit 70e changes a parameter used for three-dimensional recognition, there is a method of changing a block size of stereo matching in a case where parallax that can be calculated from camera information or a parallax image is determined to be unstable. In addition, there is a method of adjusting an extraction range when the three-dimensional recognition unit 6 extracts three-dimensional information of the head from the parallax image. As a method of changing the parameter of the recognition algorithm, the parameter may be adjusted for each divided area, based on an image-capturing range division method associated with the camera information.

The recognition reliability updating unit 71 updates recognition reliability matrix data acquired by the area information acquisition unit 70b, based on the information of the pattern identifier reconstructed by the recognition function adjustment unit 70 and the information of the changed parameter of the recognition algorithm.

As a method of updating the matrix data, there is a method of improving a value of the recognition reliability of a corresponding object recognition function in a case where a parameter of the pattern identifier or the recognition algorithm is changed in the entire image-capturing range. In addition, there is also a method or the like in which, in a case where only the pattern identifier and the parameter associated with an area where an image-capturing range is divided by the division method acquired by the area information acquisition unit 70b are changed, a value of recognition reliability corresponding to the area is improved.

The recognition reliability calculation unit 7A includes a camera information acquisition unit 7b, an area information acquisition unit 7c, and a recognition reliability determination unit 7d. The recognition reliability determination unit 7d receives camera information acquired by the camera information acquisition unit 7b, an image-capturing range division method and the recognition reliability matrix data acquired by the area information acquisition unit 7c, and the recognition reliability matrix data updated by the recognition reliability updating unit 71. Then, the recognition reliability determination unit 7d divides the image-capturing range into one area or a plurality of areas, determines recognition reliability for each area, outputs the recognition reliability for each determined area to the recognition result combining unit 8.

According to the object recognition device 1A described above, a pattern identifier and a parameter of a recognition algorithm are changed for the entire image-capturing range or for each divided area, and a value of the corresponding recognition reliability is updated. Thereby, it is possible to detect an object in a captured image or a parallax image with high accuracy, regardless of an installation environment of the camera 2 or a position of an object.

[3. Third Embodiment]

Next, an object recognition system according to a third embodiment of the present invention will be described.

FIG. 14 illustrates an internal configuration example of an object recognition system 10B according to the third embodiment.

The object recognition system 10B includes one camera 2, a distance measurement device 13, an object recognition device 1B, a database 9, a display unit 11, and an operation unit 12.

The object recognition device 1B includes a distance information acquisition unit 14, a distance image generation unit 15, and a distance image recognition unit 16, in addition to the one image acquisition unit 3, the captured image recognition unit 5, the recognition reliability calculation unit 7, and the recognition result combining unit 8. The object recognition device 1B recognizes an object, based on a captured image and a distance image in which distance information to an object is embedded in the captured image.

The distance measurement device 13 (an example of a measurement device) measures a distance to an object in an image-capturing range captured by the camera 2. For example, a distance sensor, a laser radar, an infrared tag, or the like is used as the distance measurement device 13.

The distance information acquisition unit 14 acquires distance information for each object measured by the distance measurement device 13.

The distance image generation unit 15 generates a distance image in which the distance information acquired by the distance information acquisition unit 14 is embedded in the captured image acquired by the image acquisition unit 3.

The distance image recognition unit 16 (an example of a recognition unit) recognizes an object, based on the distance information included in the distance image. At this time, the distance image recognition unit 16 recognizes the object by a measurement range division method and recognition reliability matrix data which correspond to the distance measurement device 13, and outputs recognition results to the recognition result combining unit 8. The measurement range division method and the recognition reliability matrix data which correspond to the distance measurement device 13 are read from the database 9 by the distance image recognition unit 16. Then, the distance image recognition unit 16 calculates a matching degree between an object in an overhead view image obtained by converting a viewpoint of the distance image and a template read from the database 9.

The recognition reliability calculation unit 7 calculates recognition reliability of a function of recognizing an object within a captured image by the captured image recognition unit 5, and recognition reliability of a function of recognizing an object within a distance image by the distance image recognition unit 16.

The recognition result combining unit 8 combines a matching degree indicating that an object recognized by the captured image recognition unit 5 from a captured image is a specified object and recognition reliability for recognizing an object in the captured image. In addition, the recognition result combining unit 8 combines a matching degree indicating that an object recognized by the distance image recognition unit 16 from a distance image is a specified object and recognition reliability for recognizing an object in the distance image. Then, in a case where a recognition sum value calculated by combining recognition results of the image recognition and recognition results of the distance image recognition, based on the recognition reliability is equal to or larger than a predetermined value, the recognition result combining unit 8 sets the specified object as detection results which are detected.

According to the object recognition device 1B described above, recognition reliability of a captured image, recognition results of the captured image, recognition reliability of a distance image acquired from the distance measurement device 13 and generated, recognition results of the distance image are combined, and the detection result of an object is displayed on the display unit 11. In this way, even in an environment where only one camera 2 is installed, detection accuracy of an object can be improved by using the distance measurement device 13 in combination.

[4. Modified Example]

In each embodiment described above, the object recognition devices 1, 1A, and 1B may include the database 9. In addition, the object recognition devices 1, 1A, and 1B may include the display unit 11 and the operation unit 12.

In addition, the object recognition system according to each embodiment described above can be used as a human analysis system which analyzes a human in a specified place (for example, within a station building, within a building, a road), and can be used as a monitoring system. At this time, by using an infrared camera capable of capturing an image of an object by infrared light as the camera 2, it is possible to recognize an object even at night and detect a specified object.

It is needless to say that the present invention is not limited to the above-described embodiments, and various other application examples and modification examples can be obtained as long as the application examples and the modification examples do not deviate from the gist of the present invention described in the claims.

For example, in order to describe the present invention in an easy-to-understand manner, the above-described embodiments describe configurations of a device and a system in detail, and are not limited to those including all the configurations described above. In addition, it is possible to replace a part of the configuration of a certain embodiment with a configuration of another embodiment, and furthermore, it is also possible to add a configuration of another embodiment to the configuration of the certain embodiment. In addition, it is also possible to add, delete, and replace other configurations with respect to part of the configuration of each embodiment.

In addition, control lines and information lines indicate what is considered to be necessary for explanation, and it is not limited that all the control lines and the information lines are necessarily illustrated on products. In practice, it may be considered that almost all the configurations are connected to each other.

REFERENCE SIGNS LIST

1: object recognition device
2: camera
3: image acquisition unit
4: distance calculation unit
5: captured image recognition unit
6: three-dimensional recognition unit
7: recognition reliability calculation unit
8: recognition result combining unit
9: database
10: object recognition system
11: display unit
12: operation unit

The invention claimed is:

1. An object recognition device comprising:
a processor configured to:
recognize an object by a plurality of functions, based on information which is obtained by measuring the object by a plurality of measurement devices;
calculate recognition reliability of recognition results for each function; and
combine recognition reliability of the object and the recognition results, detect a specified object, and output detection results of the specified object,
wherein in a case where information that is obtained by measuring the object by the plurality of measurement devices is a captured image which is obtained by capturing an image of the object and a parallax image which includes distance information to the object,
the object is recognized based on the captured image, and the object is recognized based on the distance information which is included in the parallax image,
a matching degree is calculated between a pattern identifier that is generated based on sample data which is read from a database and a feature part of the object that is extracted from the captured image,
a matching degree is calculated between a template that is read from the database and three-dimensional information of the object in an overhead view image that is obtained by converting a viewpoint of the parallax image, and
recognition reliability is calculated for recognizing the object in the captured image and recognition reliability is calculated for recognizing the object in the parallax image.

2. The object recognition device according to claim 1, wherein the processor is further configured to:
acquire the captured image and the parallax image from the measurement device,
acquire measurement device information of the plurality of measurement devices from the database,
acquire an image-capturing range division method and matrix data of the recognition reliability which correspond to the measurement device information from the database for each area, and
determine recognition reliability for recognizing the object in the captured image and recognition reliability for recognizing the object in the parallax image for each of the areas which are obtained by dividing the image-capturing range of the captured image in predetermined position and size, based on the image-capturing range division method.

3. The object recognition device according to claim 2, wherein in a case where results which are obtained by combining a degree indicating that the object which is recognized from the captured image is the specified object, a recognition reliability for recognizing the object in the captured image, a degree indicating that the object which is recognized from the parallax image is the specified object, and recognition reliability for recognizing the object in the parallax image, are equal to or larger than a predetermined value, the obtained results are set to detection results of the specified object.

4. The object recognition device according to claim 3, wherein the measurement device information, the division method, and the recognition reliability can be changed by an input from an operation unit through a graphical user interface (GUI) which is displayed on a display unit, and the measurement device information, the division method, and the recognition reliability which are changed are recorded in the database, and
wherein the recognition reliability is calculated for each of the areas, based on the measurement device information, the division method, and the recognition reliability which are changed and acquired from the database.

5. The object recognition device according to claim 4, wherein the processor is further configured to:
adjust a function of recognizing the object in the captured image and a function of recognizing the object in the parallax image, based on the measurement device information; and
update the matrix data in which the recognition reliability is stored, based on a function of recognizing the adjusted object.

6. The object recognition device according to claim 5, wherein the measurement device information includes at least one of an installation environment of each measurement device and internal information of each measurement device.

7. An object recognition device comprising:
a processor configured to:
recognize an object by a plurality of functions, based on information which is obtained by measuring the object by a plurality of measurement devices;
calculate recognition reliability of recognition results for each function; and
combine recognition reliability of the object and the recognition results, detect a specified object, and output detection results of the specified object,
wherein in a case where information that is measured by the plurality of measurement devices is a captured image which is obtained by capturing an image of the object and a distance image in which distance information to the object is embedded in the captured image, the object is recognized based on the captured image, and the object is recognized based on the distance information which is included in the distance image, a matching degree of the object is calculated between a feature part that is extracted from the captured image and a pattern identifier that is generated based on sample data which is read from a database, a matching degree is calculated between the object in an overhead view image that is obtained by converting a viewpoint of the distance image and a template that is read from the database, and recognition reliability is calculated for recognizing the object in the captured image and recognition reliability is calculated for recognizing the object in the distance image.

8. An object recognition system comprising:
a plurality of measurement devices that measure an object;
a recognition unit that recognizes an object by a plurality of functions, based on information which is obtained by measuring the object by the plurality of measurement devices;
a recognition reliability calculation unit that calculates recognition reliability of recognition results that are obtained by recognizing the object by the recognition unit, for each function;
a combining unit that combines recognition reliability of the object and the recognition results, detects a specified object, and outputs detection results of the specified object; and
a display unit that displays the detection results,
wherein in a case where information that is obtained by measuring the object by the plurality of measurement devices is a captured image which is obtained by capturing an image of the object and a parallax image which includes distance information to the object,
the object is recognized based on the captured image, and the object is recognized based on the distance information which is included in the parallax image,
a matching degree is calculated between a pattern identifier that is generated based on sample data which is read from a database and a feature part of the object that is extracted from the captured image,
a matching degree is calculated between a template that is read from the database and three-dimensional information of the object in an overhead view image that is obtained by converting a viewpoint of the parallax image, and
recognition reliability is calculated for recognizing the object in the captured image and recognition reliability is calculated for recognizing the object in the parallax image.

* * * * *